Feb. 21, 1967  J. D. BENNETT ETAL  3,304,776
DIFFERENTIAL PRESSURE MEASURING INSTRUMENT
Filed May 7, 1963  5 Sheets-Sheet 1

INVENTORS
JOHN D. BENNETT
PRESTON E. CHANEY
BY JACK WEIR JONES and
FRED M. MAYES

ATTORNEYS

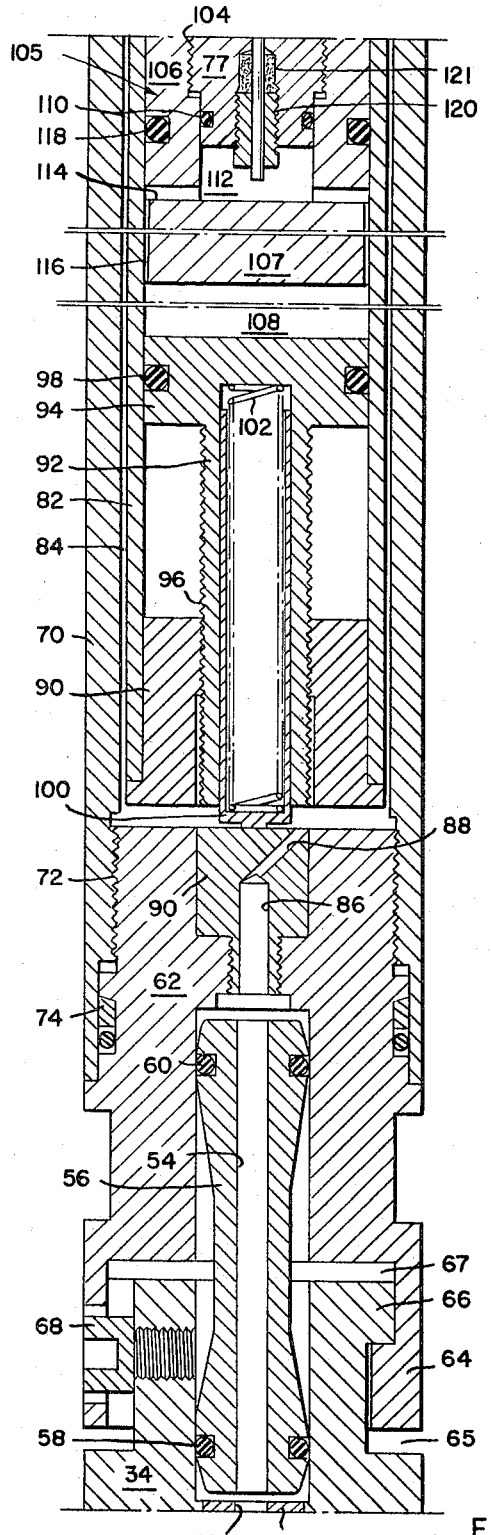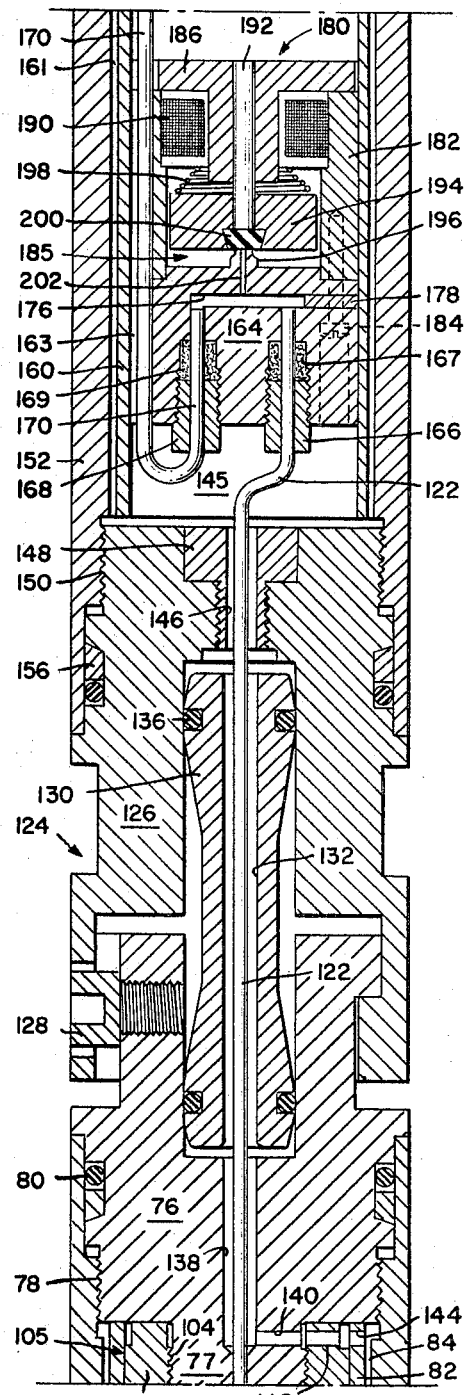
FIG. 3.
FIG. 4.
INVENTORS
JOHN D. BENNETT
PRESTON E. CHANEY
JACK WEIR JONES and
FRED M. MAYES
BY
ATTORNEYS Feb. 21, 1967  J. D. BENNETT ETAL  3,304,776
DIFFERENTIAL PRESSURE MEASURING INSTRUMENT
Filed May 7, 1963  5 Sheets-Sheet 3

INVENTORS
JOHN D. BENNETT
PRESTON E. CHANEY
JACK WEIR JONES and
FRED M. MAYES
BY
ATTORNEYS INVENTORS
JOHN D. BENNETT
PRESTON E. CHANEY
JACK WEIR JONES and
FRED M. MAYES
BY
ATTORNEYS Feb. 21, 1967   J. D. BENNETT ETAL   3,304,776
DIFFERENTIAL PRESSURE MEASURING INSTRUMENT
Filed May 7, 1963   5 Sheets-Sheet 5

INVENTORS
JOHN D. BENNETT
PRESTON E. CHANEY
JACK WEIR JONES and
FRED M. MAYES

BY
ATTORNEYS

United States Patent Office 3,304,776
Patented Feb. 21, 1967

3,304,776
DIFFERENTIAL PRESSURE MEASURING
INSTRUMENT
John D. Bennett, Richardson, Preston E. Chaney, Dallas, and Jack Weir Jones and Fred M. Mayes, Richardson, Tex., assignors to Sun Oil Company, Philadelphia, Pa., a corporation of New Jersey
Filed May 7, 1963, Ser. No. 278,556
4 Claims. (Cl. 73—151)

This invention relates to instruments for measuring and recording pressure changes which occur over extended periods of time and, more particularly, to an improved differential pressure measuring instrument of the type disclosed in Patent No. 2,942,473 issued June 28, 1960, to Fred M. Mayes which is particularly adapted for use in well bores penetrating underground petroleum reservoirs.

As pointed out in said Mayes patent, the measurement of small pressure changes against a background of high pressure is significant in determining the characteristics of oil reservoirs. The changes, as a function of time, may be produced by injection or production to or from wells in the reservoir other than that in which the differential pressure measuring mechanism is located. These matters need not be detailed herein since the basic requirements of such an instrument are set forth in said patent.

The general object of the present invention is to provide an instrument of high reliability and high sensitivity. As will appear, numerous aspects of the construction lead to the attainment of this object.

Certain detailed matters are particularly involved in other aspects of the invention.

Temperature compensation is provided in a novel fashion, such compensation being important since slight changes in temperature may seriously affect the results particularly in view of the fact that very small pressure changes are to be measured against a very large background pressure.

Provisions are also made for resetting the reference datum of measurement. By reason of this very high sensitivity is secured. Furthermore by an extension of the resetting aspect, the instrument is maintained at all times within proper ranges of its recording parts.

Since an instrument such as this is desirably operated entirely independently of surface control and surface power supply, batteries must be used for operation, and it is therefore important that battery drainage must be minimized. In accordance with the invention this end is achieved.

While the diameter of an instrument of this type is limited, by reason of the fact that it must frequently be lowered through small diameter tubing, the necessary volume for its components is achieved by elongation. If the instrument were rigid, this might involve binding in small diameter curved passages. It is therefore a further object of the invention to provide an arrangement by which the instrument is made mechanically flexible so as to pass through curved passages.

While the instrument is primarily designed for the measurement of changes in ambient pressures, it may also be used as a transducer and recorder of temperature changes against a high and varying temperature background. This may be accomplished by associating the instrument with a vapor thermometer which will produce pressures as functions of temperature. The pressure-sensitive portions of the instrument may thus be operated in response to temperature variation and to the end that very small temperature variations may be detected such as may particularly result from the influx of liquids into a bore hole, the liquids possibly having temperatures differing from that of the ambient mud or other bore hole fluid surrounding the instrument. In this case, also, temperature compensation within the detecting and recording portions of the instrument is desirable to remove ill-defined temperature disturbances.

The attainment of the foregoing as well as other objects of the invention, particularly those relating to details of construction and operation, will become apparent from the following description when read in conjunction with the accompanying drawings, in which:

FIGURE 3 is a sectional view of the next upper portion of the instrument which includes one universal joint and the temperature compensating section;

FIGURE 4 is a sectional view of the next upper portion of the instrument which includes a second universal joint and the pressure equalizing section;

As will appear from the following description, various of the parts have lengths greatly exceeding diameters involved, and where such parts occur breaks are shown in the figures to avoid the showing of very long parts, only their ends being illustrated.

Figure 1:
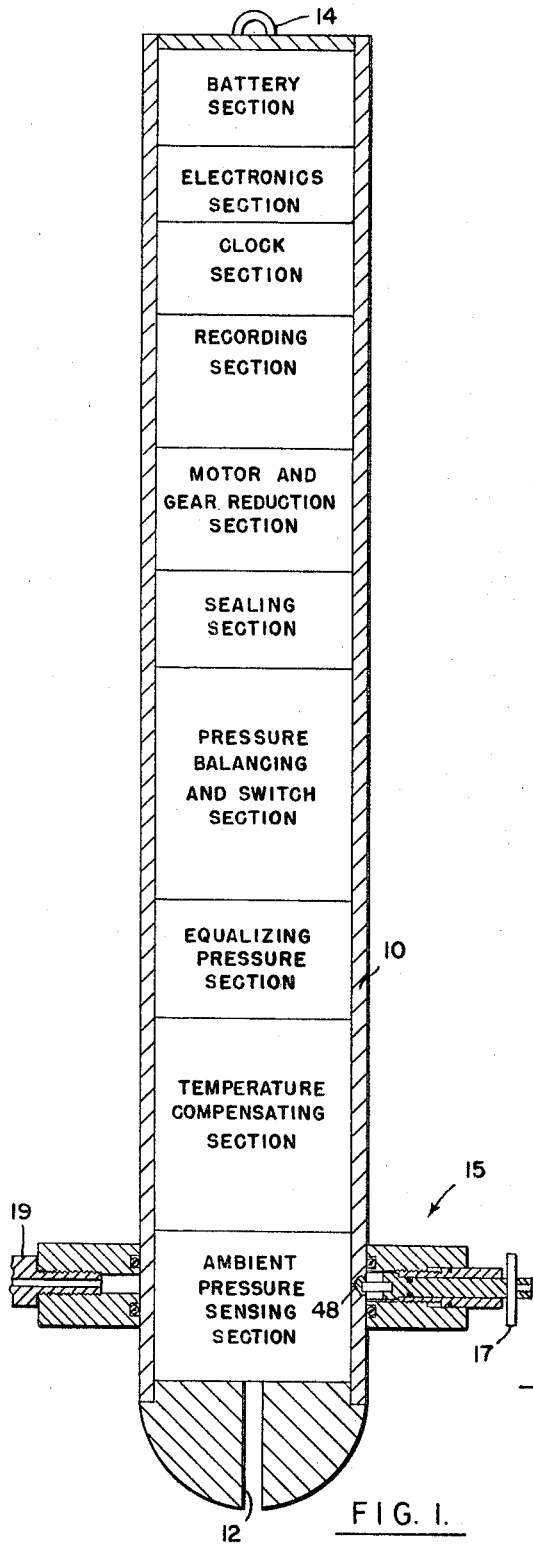
FIGURE 1 is a schematic diagram of the complete instrument together with an auxiliary pressurizing tool.

Before describing the details of each of the component sections, reference may be made to FIGURE 1 which schematically illustrates the relative positions of the various sections within a casing 10 capable of withstanding high pressure gradients. In the subsequent detailed description it will become apparent that casing 10 is actually composed of a plurality of individual and separable casing portions; however, it will be noted that casing 10 completely encloses and seals all of the component sections except for the lowermost pressure sensing section which is in communication with the well bore fluids through a passage 12 in the casing. The instrument is raised and lowered by means of a wire line (not illustrated) secured to the upper end of the instrument by conventional attachment means conventionalized as a hook 14. The lower end of the instrument is adapted to receive a pressurizing tool 15 by means of which the instrument may be initially pressurized to a predetermined pressure less than the minimum ambient pressure to be measured as will be subsequently described in the description of operation.

The details of the instrument will now be described beginning with the lowermost section illustrated in FIGURE 2. A first section 16 of casing 10 is sealed at 18 to a plug 20 the lowermost end of which is provided with the aforementioned passage 12 in the form of a transverse slot. The slot is in communication with a vertically extending bore 22 which terminates at the uppermost surface of plug 20. A vertically movable piston member 24 normally abuts the upper surface of plug 20 but is capable of moving upwardly away from plug 20 due to the pressure exerted on insert member 26 which is threadedly secured to member 24, a sealing ring 30 being clamped therebetween.

Piston members 24 and 26 also serve to clamp the lower end of a flexible bag 32 the upper end of which is clamped between stationary members 34 and 36. The upper end of casing section 16 is threadedly engaged on member 34 and sealed thereto by a seal 38 and stationary member 36 contains a vertical bore 40 which extends upwardly into communication with bore 42 of a cylindrical liner 43. Liner 43 further includes a radial passage 44 which is in communication with a second radial passage 46 contained in member 34 the latter of which communicates with a threaded bore 52 containing an Allen screw 48 adapted to seal against a sealing washer 50. The Allen screw is adapted to be engaged by the inner end of Allen wrench 17 so that the screw may be partially retracted to permit the passage of pressurizing gas such as nitrogen to pass from coupling 19 around the threads and into the interior of the instrument. Thereafter, the screw is again tightened thereby sealing the pressurizing gas within the instrument and the tool is removed.

Cylindrical liner 43 extends upwardly to the position shown at the bottom of FIGURE 3 at which point bore 42 is in communication with a bore 54 in a connecting link 56. The lower end of link 56 contains a first O-ring 58 in sealing engagement with member 34 and the upper end of link 56 carries a second O-ring 60 which is in sealing engagement with an upper member 62. Upper and lower members 62 and 34 include mutually engaging portions 64 and 66 forming a bayonet type joint which remains locked in assembled condition by means of a locking screw 68. Clearance spaces 65 and 67 adjacent engaging portions 64 and 66 and loose fits elsewhere in the joint allow a limited amount of relative movement between the joint members such that the lower pressure sensing section may bend slightly with respect to the temperature compensating section located immediately above the joint to permit the instrument to flex to pass freely through bends in pipes.

The temperature compensating section (FIGURE 3) includes a casing portion 70 the lower end of which is threadedly secured to joint member 62 at 72 and sealed thereto by seal 74. Casing portion 70 extends upwardly and threadedly receives a joint member 76 at 78 as shown at the lower portion of FIGURE 4. It will also be noted that the upper end of casing 70 is sealed with respect to joint member 76 by means of a seal 80, seals 74 and 80, as well as other seals to be described subsequently, being of the type more fully disclosed in copending application Serial No. 254,135 filed on January 28, 1963.

The temperature compensating section includes an aluminum cylinder 82 having an external diameter slightly less than the internal diameter of casing portion 70 so that an annular chamber 84 is formed between these elements. Annular chamber 84 is in communication with bore 54 of link 56 by means of passages 86 and 88 located in an insert member 90 threadedly engaged in joint member 62.

The lower end of aluminum cylinder 82 is rigidly secured to a closure member 90 which receives the lower threaded portion of a stem 92 having an integral head portion 94 the latter of which contains an O-ring 98 sealing against the interior of aluminum cylinder 82. Stem 92 is hollow and contains an elongated cup-shaped member 100 the lower end of which abuts insert 90. A compression spring 102 is contained within cup 100 and the upper end of the spring bears against head portion 94 so that the upper end of cylinder 82 is maintained in abutment with joint member 76 as shown most clearly at the bottom of FIGURE 4.

As shown at the top of FIGURE 3 and the bottom of FIGURE 4, the central, depending portion 77 of joint member 76 contains threads 104 rigidly securing the upper end of a temperature compensating element 105 which includes an upper, cylindrical portion 106 and a lower block portion 107. Portion 107 extends downwardly within cylinder 82 and terminates above the upper surface of head 94 so as to define a chamber 108. The volume of chamber 108 changes as a function of temperature due to the fact that aluminum cylinder 82 tends to expand and contract so that the lower end thereof moves members 90, 92 and 94 the latter of which slides within cylinder 82. On the other hand, element 105 is composed of Invar or equivalent metal having a low thermal coefficient which does not expand or contract appreciably with temperature changes. Of course, it will be understood that the block portion 106 of Invar element 105 and chamber 108 are of considerably greater axial extent than that appearing in FIGURE 3, these elements having been axially shortened as indicated by their respective break lines.

As further shown at the top of FIGURE 3, portion 77 of member 76 contains an O-ring seal 110 in sealing engagement with the internal surface of element 105 so that a second chamber 112 is defined by portions 77, 106 and 107; an additional seal 118 being provided between portion 106 and cylinder 82. Chamber 112 is in communication with chamber 108 by means of radial ports 114 and clearance space 116 so that the temperature compensating chamber is actually composed of both chambers 108 and 112 although the volumetric changes for temperature compensation occur only in chamber 108.

Portion 77 of member 76 also contains a threaded plug 120 which retains packing 121 forming a seal about the lower end of a tube 122 which extends upwardly, as shown in FIGURE 4, through a second universal joint generally indicated 124. This universal joint is identical in both structure and function to that previously recited and includes a lower joint member 76, an upper joint member 126, a locking screw 128 and a connecting link 130 having a central bore 132 and a pair of O-ring seals 134 and 136. The lower end of bore 132 is in communication with vertical passage 138 and radial passage 140 located in member 76. Radial passage 140 is in alignment with two additional radial passages 142 and 144 which are provided in element 105 and cylinder 82, respectively. Thus, the lower end of bore 132 is in fluid communication with bore 54 of lower connecting link 56 through passages 86 and 88, annular chamber 84, radial passages 144, 142, 140 and vertical bore 138.

The upper end of bore 132 is in communication with space 145 by means of a vertical bore 146 of insert member 148 which is threadedly engaged in the upper end of joint 126. The upper end of joint 126 further includes external threads 150 which engage mating threads on the lower end of casing member 152 which extends upwardly therefrom throughout the entire length of FIGURE 5 and terminates in threaded engagement with member 154 as shown in the lower portion of FIGURE 6. The lower end of casing portion 152 is sealed with respect to joint 126 by means of seal 156 and the upper end of casing 152 is similarly sealed to member 154 by means of seal 158. A cylindrical liner 160 extends throughout substantially the entire length of casing portion 152 and is secured to member 154 at 162 as shown at the bottom of FIGURE 6. The external diameter of cylindrical liner 160 is slightly less than the internal diameter of casing portion 152 so that the fluid pressure in space 145 also surrounds liner 160. In addition, this pressure exists within liner 160 throughout the full extent thereof due to a vertical groove 163 in a support member 164 secured to the lower end of liner 160.

Support member 164 receives a first threaded plug 166 which retains packing 167 about tube 122 and also receives a second plug 168 which retains packing 169 about a second tube 170, the latter of which extends upwardly through the above mentioned groove 163. Tubes 122 and 170 are in communication with each other through a transverse bore 176 the right-hand end of which is sealed by a closure plug 178

Immediately above support member 164 there is provided a solenoid operated equalizing valve generally designated 180 which includes a housing 182 bolted to member 164 by means of bolt 184. The solenoid includes a core 186 surrounded by a spool 188 containing a coil 190 and the valve includes a head portion 194 rigidly connected to a plunger 192. Valve head 194 is biased downwardly by a spring 198 and contains a resilient insert 200 which maintains an effective seal across a vertical passage 202 in nipple 196. It will be noted that no seals are provided in the valve assembly so that the pressure in space 185 is the same as that existing within and around liner 160. Thus, when the valve head 194 is lifted by plunger 192 upon energization of coil 190, passage 202 is placed in communication with the interior of liner 160 and with tubes 122 and 170 through passage 176 so that the pressure in all portions of the instrument is equalized.

Figure 5:
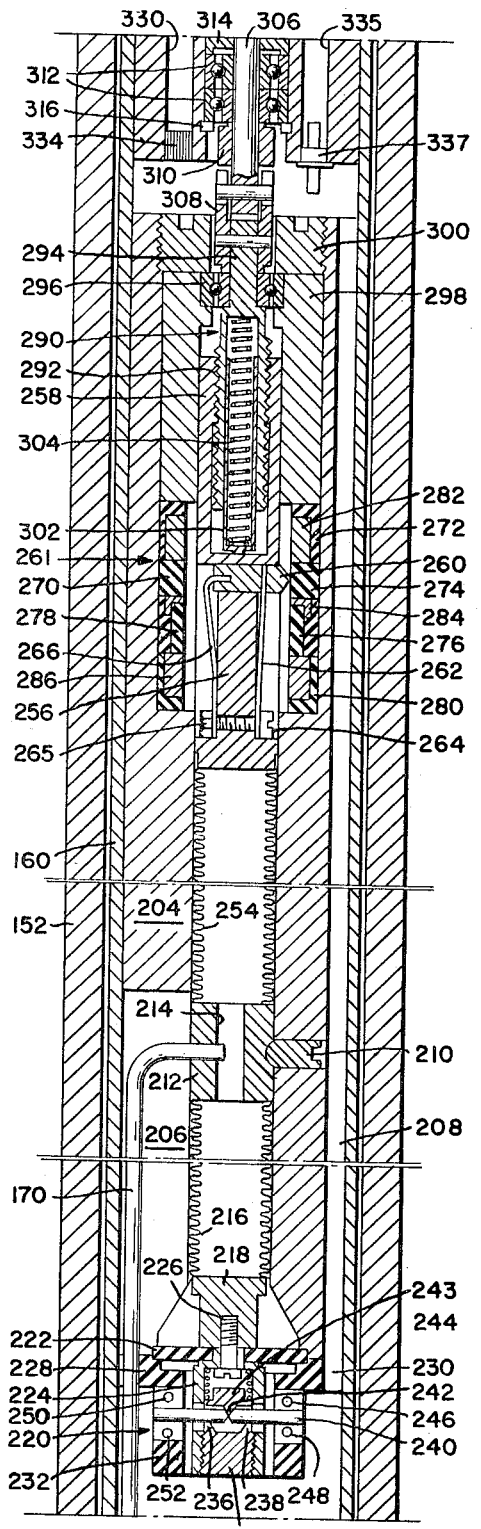
FIGURE 5 is a sectional view of the next upper portion of the instrument which includes the pressure balancing and switch section.
Figure 6:
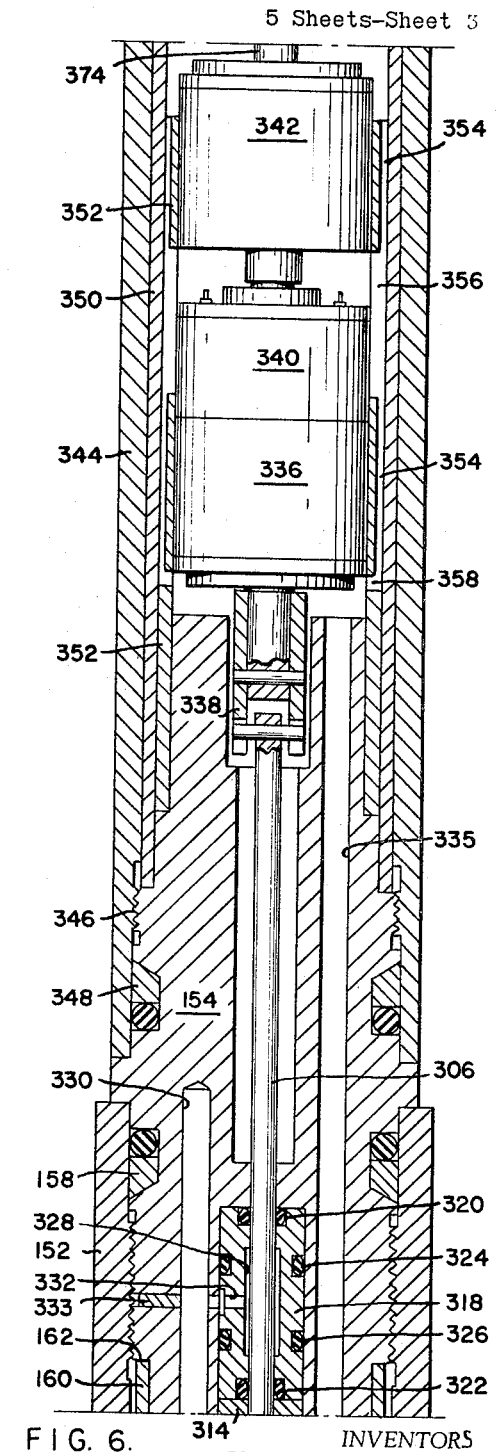
FIGURE 6 is a sectional view of the next upper portion of the instrument which includes a high pressure sealing section and the motor and gear reduction units.

Referring to FIGURE 5, the pressure balancing section includes a housing 204 having an enlarged slot 206 through which tubing 170 extends and a groove 208 which permits lead wires (not shown) to pass through this section. Housing 204 receives an Allen screw 210 which rigidly secures a block 212 within the hollow central portion of the housing, block 212 having a vertical passage 214 which is in communication with the interior of tubing 170. The upper end of a bellows 216 is sealed to block 212 and the lower end of the bellows is sealed about a movable plug 218 which actuates a pressure responsive switch assembly 220.

This switch assembly includes a flexible diaphragm 222 the central portion of which is clamped between plug 218 and a movable sleeve 224 by means of a bolt 226. The peripheral edge of the diaphragm is clamped between housing 204 and a support member 228 having a vertical passage 230 in alignment with groove 208. Support member 228 is composed of an insulating material and includes a depending, cylindrical portion 232 which is concentric with and spaced about the movable sleeve 224. The internal surface at the lower portion of sleeve 224 is threaded so as to receive an adjustable position plug 234 having a pair of upwardly extending fulcrum points 236 and 238. An electrically conductive bar 240 normally rests on points 236, 238 and extends radially outward through slots in sleeve 224 and support member 232. The center of bar 240 is engaged by a third fulcrum point 242 carried by a member 243 which is urged downwardly by a compression spring 244 contained within sleeve 224.

The depending cylindrical portion of insulated member 232 supports a high pressure contact 246 and a low pressure contact 248 which are adapted to be engaged by the right-hand end of bar 240 upon slight vertical movement of the entire bar and fulcrum point assembly. Member 232 also supports a high pressure limit contact 250 and a low pressure limit contact 252 which contacts are vertically spaced apart by a distance slightly greater than the spacing of contacts 246 and 248. Thus, the left-hand end of bar 240 engages one or other of the limit contacts 250, 252 only upon continued vertical movement of sleeve 242 after the bar engages one of contacts 246 or 248 and pivots about fulcrum point 242.

The pressure balancing section further includes a second compressible bellows 254 the lower end of which is sealed to block 214 and the upper end of which is sealed to the lower end of an elongated member 256 the upper portion of which is cylindrical and provided with internal threads at 258. The lower portion of member 256 is of solid cross-section except for a transverse bore which slidably receives an electrically conductive contact 260 which is spring-biased by means of a flat spring 262 secured to member 256 by bolt 264 and nut 265. Bolt 264 also serves as a rigid connection for a lead wire 266 the latter of which maintains a good electrical connection between grounded member 256 and contact 260.

Housing 204 is counterbored at 270 so as to receive a plurality of annular insulation rings 272, 274, 276, 278 and 280 which retain three axially separated conductive rings 282, 284 and 286. These conductive rings are adapted to be contacted and thereby grounded by vertically movable contact 260 so as to operate as a three-range switch generally designated 261 although the detailed operation of the range switch is deferred until the subsequent description of the electronic circuitry. It will also be understood that the vertical movement of member 256 serves to compress or elongate bellows 154 and thereby change the pressure in bellows 216 so that the latter actuates the previously described pressure responsive switch assembly 220.

The above mentioned vertical movement of member 256 results from the threaded engagement of this member with a lead screw 290 having an externally threaded cylindrical portion 292 and an upper solid portion 294. Upper portion 294 of the lead screw passes through thrust bearings 296 which are maintained in place between a cylindrical insert 298 and a locking nut 300 threadedly engaged with housing 204. Cylindrical portion 292 of lead screw 290 contains an elongated cup 302 containing a spring 304 which prevents backlash between the lead screw and member 256 as the rotation of the lead screw produces reciprocation of member 256.

The upper portion 294 of lead screw 290 is coupled to a small diameter shaft 306 by means of coupling member 308. The lower end of shaft 306 carries a thrust ring 310 which bears against a pair of bearings 312 retained in position between a spacer element 314 and a lock ring 316 engaged in a groove in member 154.

In order to prevent the high pressure in the pressure balancing section from passing upwardly into the above sections of the instrument which are at atmospheric pressure, a high pressure seal assembly is provided in member 154 surrounding shaft 306. This assembly includes an insert member 318 which carries a first pair of O-ring seals 320, 322 which engage the shaft and a second pair of seals 324, 326 which engage a portion of member 154. The internal surface of insert 318 is enlarged at 328 and this annular space surrounding the shaft is in communication with a vertical bore 330 by means of a radial passage 332 the radially outer end of which is sealed by a plug 333. Bore 330 and passage 332 are filled with grease which is forced into the annular space surrounding the shaft by the action of a small piston member 334 shown at the top of FIGURE 5 which is positioned in the lower portion of bore 330 and forced upwardly against the grease by the high pressure existing in the pressure balancing section therebelow. In this manner, an effective grease seal is maintained about the shaft 306 which is slightly flexible so as to impose a minimum amount of lateral stress on the O-rings 320 and 322.

Member 154 also includes a vertical passage 335 for permitting lead wires (not shown) to pass vertically therethrough. These lead wires are sealed by a seal 337 positioned at the lower end of bore 335 and it will be understood that they extend downwardly through bore 208 to both the range switch 261 and pressure actuated switch 220.

Shaft 306 extends upwardly through member 154 and is coupled to the output shaft of a gear reduction unit 336 by means of a coupling sleeve 338. Reduction unit 336 is driven by an electric motor 340 which also drives a second gear reduction unit 342 positioned immediately thereabove.

The motor and reduction units comprising this section are sealed by means of an outer casing 344 the lower end of which is threadedly engaged with member 154 at 346 and sealed therewith by means of seal 348. Within casing member 344 there are positioned an outer liner 350 and an inner liner 352 the latter of which includes a vertical groove 354 extending throughout the length of the motor and reduction units as well as first and second slots 356 and 358 through which the aforementioned lead wires may extend from the motor to the various sections both above and below the motor.

Figure 7:
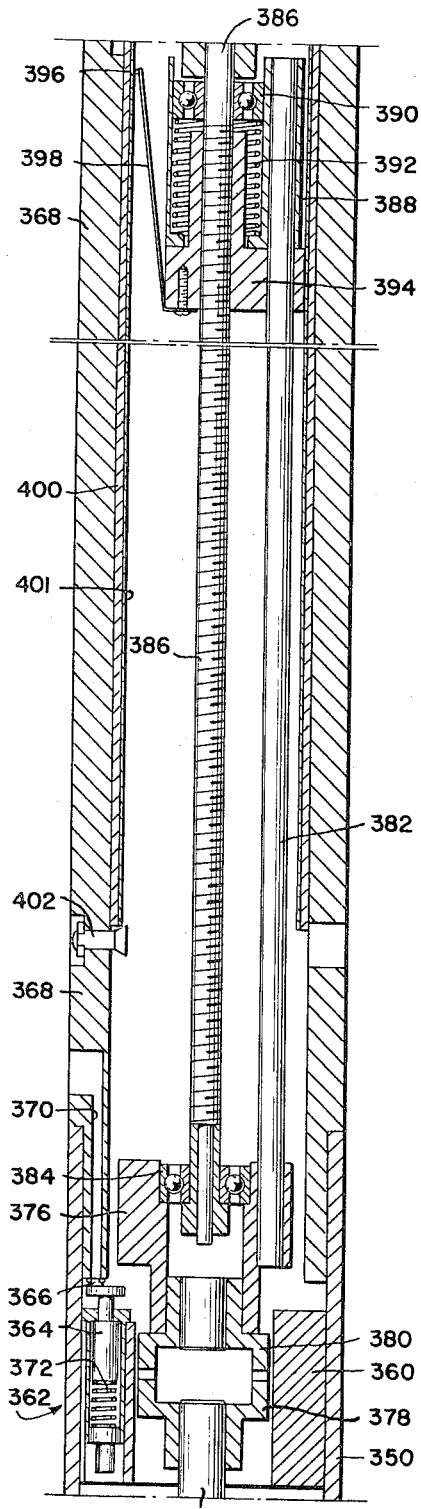
FIGURE 7 is a sectional view of the next upper portion of the instrument which contains the recording section.

Reference is now made to FIGURE 7 which is a continuation of FIGURE 6 with the high pressure casing 344 removed although it is to be understood that the entire instrument is enclosed by such a casing as schematically illustrated in FIGURE 1.

As shown at the bottom of FIGURE 7, an annular support member 360 is secured to liner 350 and supports a plurality of electrical contact assemblies 362 (only one of which assemblies is illustrated) the purpose of which is to provide separable electrical connections so that the recording section may be separated from the motor section without breaking the lead wires. Each contact assembly includes a conductive pin 364 which is biased into engagement with a stationary contact member 366 carried by cylindrical housing 368 which also includes a passage 370 for each assembly so that the lead can extend upwardly from contact 366. Movable pins 364 are biased by springs 372 so as to engage their respective stationary contact 366.

The output shaft 274 of gear reduction unit 342 is coupled to a rotatable support bracket 376 by means of coupling members 378 and 380. Bracket 376 carries a pair of slide rods 382, only one rod being visible in FIGURE 7 since the other is directly therebehind. Bracket 376 also supports a bearing 384 which receives the lower end of a lead screw 386 so as to permit rotation of both the bracket and the lead screw about the longitudinal axis of the screw. The upper end of slide rods 382 are secured in a second rotatable bracket 388 which is journalled for rotation about the upper end of lead screw 386 by means of a bearing 390. A spring 392 is contained between the bearing assembly and the lower end of bracket 388 so that the bracket forms a resilient abutment limiting the travel of a carriage 394 threadedly engaged on lead screw 386 and slidable along rods 382. The carriage 394 carries a stylus point 396 biased outwardly by a resilient strap 398 composed of spring steel.

A cylindrical chart holder 400 surrounds the stylus assembly and is removably secured in position between a fixed pin 402 and a movable pin 403 biased downwardly by a spring 405. The chart holder secures a cylindrical chart 401 which is scribed by stylus point 396 as the latter is rotated by shaft 374 and vertically translated by the rotation of lead screw 386.

Figure 8:
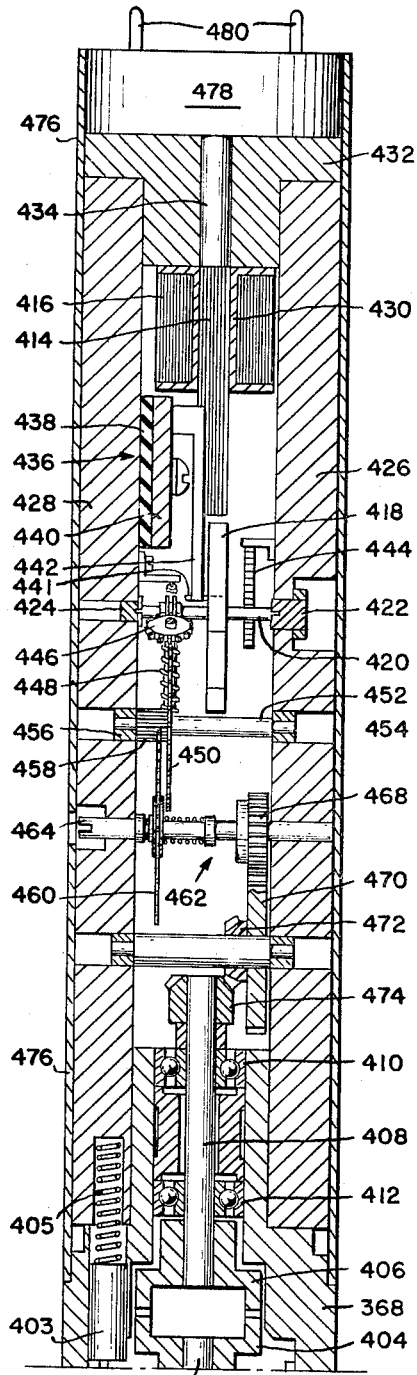
FIGURE 8 is a sectional view of the next upper portion of the instrument which contains the clock driving section.

The upper end of lead screw 386 is driven through coupling members 404 and 406 by shaft 408 journalled in bearings 410 and 412, shaft 408 being the output shaft of an electric clock mechanism illustrated in FIGURE 8.

This clock mechanism includes a laminated pole piece 414 which extends through an electromagnetic coil 416 such that the lower end of the pole piece is immediately adjacent a three-lobe flywheel 418 rigidly secured to a shaft 420 mounted for rotation in bearings 422 and 424 located in side plates 426 and 428, respectively. Coil 416 is wrapped about a spool 430 which is secured in place by a spacer 432 composed of a non-magnetic material such as brass and this spacer further supports a permanent magnet 434 which applies a biasing magnetic field to the core 414.

Side plate 428 mounts an electrical contact assembly 436 which includes an insulation gasket 438 and a conductive bracket 440 the latter of which carries a resilient contact arm 442. The free end of contact arm 442 intermittently engages a projecting stud 441 carried by flywheel 418 so as to intermittently close a circuit to the driving coil 416 whereby the flywheel 418 is oscillated against the light biasing force imposed on shaft 420 by a hair spring 444. The oscillations of shaft 420 are converted into unidirectional rotational of a worm screw 448 by a conventional ratchet drive coupling 446. The worm screw is engaged by gear 450 rigidly secured to shaft 452 journalled in bearings 454 and 456. Shaft 452 also mounts a drive gear 458 which engages a driven gear 460. Gear 460 serves as an input to an adjustable speed assembly 462 the output speed of which may be varied by angular adjustment of an adjusting screw 464. The speed adjusting assembly 462 may be of various forms and a detailed description thereof is not deemed necessary, it being noted for purposes of this description that the rotation of gear 460 is transmitted to gear 468 by way of the shaft of the speed adjusting assembly. The gear 468 drives shaft 408 through gear 470 and a pair of beveled gears 472 and 474. It will therefore be apparent that the clock mechanism rotates lead screw 386 so as to move carriage 394 and the stylus point 396 vertically as a function of time, the rate of movement being determined by speed adjusting assembly 462 which may be present prior to the operation of the instrument.

It will also be noted that the entire clock mechanism is contained within a cylindrical liner 476 the lower end of which is secured to housing 368 and the upper end of which is secured to an electrical plug member 478 having contact pins 480 adapted to connect the clock section to the electronic section located immediately thereabove as schematically illustrated in FIGURE 1. However, before describing the details of the electronic section, the general operation of the above described mechanical elements will be set forth.

Figure 2:
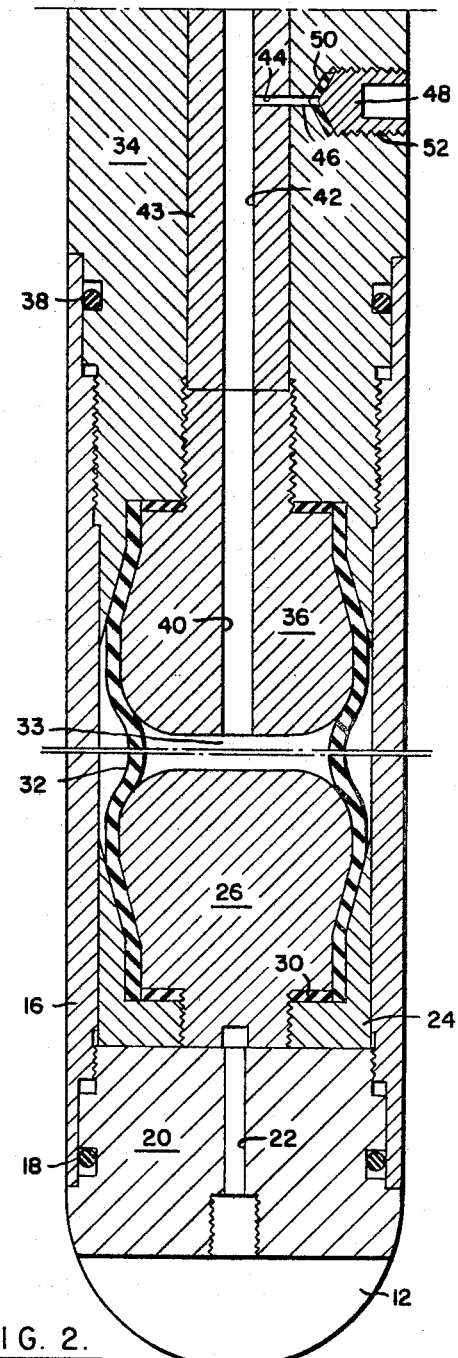
FIGURE 2 is a sectional view of the lowermost end of the instrument which contains the pressure sensing section.

Referring first to FIGURES 1 and 2, the pressurizing tool 15 is slipped over the end of the instrument and positioned such that the inner portion of Allen wrench 17 engages the Allen screw 48. A source of high pressure gas such as nitrogen is connected to the tool through coupling member 19 and, upon rotation of wrench 17 so as to loosen and partially retract screw 48, the high pressure gas passes about the threads of the Allen screw and enters the interior of flexible bag 32 via radial passages 46 and 44 which communicate with the interior of bag 32 through bores 42 and 40. This pressurizing gas also passes upwardly through passages 42, 54, 86 and 88 into annular chamber 84 surrounding cylinder 82 from which it continues to pass through radial passages 144, 142 and 140 into vertical passages 138, 132, 146 into space 145 of the pressure balancing section. From this space the pressurizing gas also passes upwardly within liner 160 by means of groove 163 so that the interior of sleeve 160 is pressurized as well as the exterior thereof due to the passage of the gas upwardly about sleeve 160 in annular chamber 161. The high pressure sealing section including seals 158, 320, 322 and 337 prevent the further upward passage of the pressurizing gas so that all of the sections above the high pressure seal section remain at atmospheric pressure.

The pressurizing gas obviously surrounds bellows 216 and 254 since the entire pressure balancing section is pressurized. In addition, it is to be understood that valve 194 is opened during the pressurizing step so that the pressurizing gas within liner 160 may pass through passages 202 and 176, tube 170 and block 212 into the interior of bellows 216 and 254. With the valve open, the pressurizing gas also passes through tube 122 into the temperature compensating chambers 108 and 112 so that all portions of the instrument are initially brought to an equal pressure. Thereafter, valve 194 is closed so as to prevent subsequent pressure changes from being communicated through tubes 122 and 170 until the valve is reopened during the subsequent operation of the instrument.

Of course, it is to be understood that the pressure to which all portions of the instrument are initially pressurized is less than the ambient pressure which is to be sensed and recorded by the instrument. For example, if the anticipated pressure in the well bore is in the order of 4000 p.s.i., the instrument may be initially pressurized to a value in the order of 3500 p.s.i. At this point, it is to be noted that the pressurizing of the instrument prior to the operation thereof is of particular importance since the maximum pressure differential across the operating portions of the instrument during use is never greater than a few hundred pounds as opposed to several thousand pounds as would be the case if the instrument were not initially pressurized.

After the instrument is fully assembled and pressurized in the above manner, it is then lowered into the bore hole or underground reservoir to the position at which the ambient pressures are to be measured and recorded. Once the instrument is in position, the ambient fluid flows through groove 12 and passage 22 so that the ambient pressure is exerted against piston members 24 and 26. Since the ambient pressure is several hundred p.s.i. greater than the pressure to which the system was initially pressurized, piston members 24 and 26 are forced upwardly so as to decrease the volume within bag 32 and thereby bring the pressure therein up to that of the ambient fluid. Of course, this sensed pressure is communicated to the pressure balancing section through the previously described passages so that this sensed pressure exists externally of bellows 216 and 254. However, as long as valve 194 remains closed, the sensed pressure is not admitted to the interior of these bellows and they remain at a pressure with is the initial, reference pressure corrected for temperature change by the expansion of aluminum cylinder 82 which varies the volume of reference chamber 108.

Since the sensed pressure is greater than the reference pressure, bellows 216 will be compressed thereby raising plug 218 and flexing diaphragm 222 such that contact bar 240 is brought into engagement with high pressure contact 246. Although the details of the electronic circuitry have been deferred, it will be understood that the effective result of the switch movement just described is to actuate motor 340 so that both of its output shafts rotate in a first direction. The lower output shaft of the motor (not illustrated) drives reduction gear unit 336 which, in turn, rotates shaft 306 the lower end of which is coupled to lead screw 290 which rotates in a direction such as to move member 256 downwardly and thereby compress bellows 254. The compression of this bellows continues until such time as the pressure therein balances the external, sensed pressure so that lower bellows 216 expands and disengages bar 240 from contact 246. During the compression of bellows 254 and the expansion of bellows 216, the upper shaft of motor 340 drives reduction gear unit 342 which rotates the entire stylus assembly including the slide bars 382, the upper and lower brackets 388, 376 and stylus carriage 394. Stylus point 396 therefore records the amount of rotational movement of the motor which was required to compress bellows 254 so as to balance the sensed pressure and this recording is in the form of an arcuate line scribed on the interior of the recording chart. Thus, the length of the arcuate line is an accurate measurement of the pressure differential which existed between the reference pressure, corrected for temperature change, and the sensed pressure of the ambient fluid in the bore hole.

In addition to recording the magnitude of the sensed pressure, the time at which the measurement was made is also recorded on the chart. This is accomplished by the operation of the clock which continuously rotates lead screw 386. Since the stylus carriage is threadedly received on the lead screw and prevented from rotating therewith by means of the slide bars and bracket assembly, the carriage is continuously driven downwardly and the vertical position at which the arcuate line occurs determines the time at which the measurement was made.

Upon the subsequent occurrence of another small increase or decrease in the ambient pressure, bellows 216 is again compressed or elongated so as to again balance the sensed pressure and the occurrence of this pressure change is recorded in the same manner as that previously described.

The above description of operation refers to that which occurs during the operation of the instrument so long as the ambient pressure does not vary in excess of a predetermined amount above or below the reference pressure. In the event that a pressure change occurs which is greater than the limits of the predetermined amount, the limit contacts 250 and 252 come into operation along with the contacts 260, 282, 284 and 286 comprising the range switch assembly as will be described more fully hereinafter.

Figure 9:
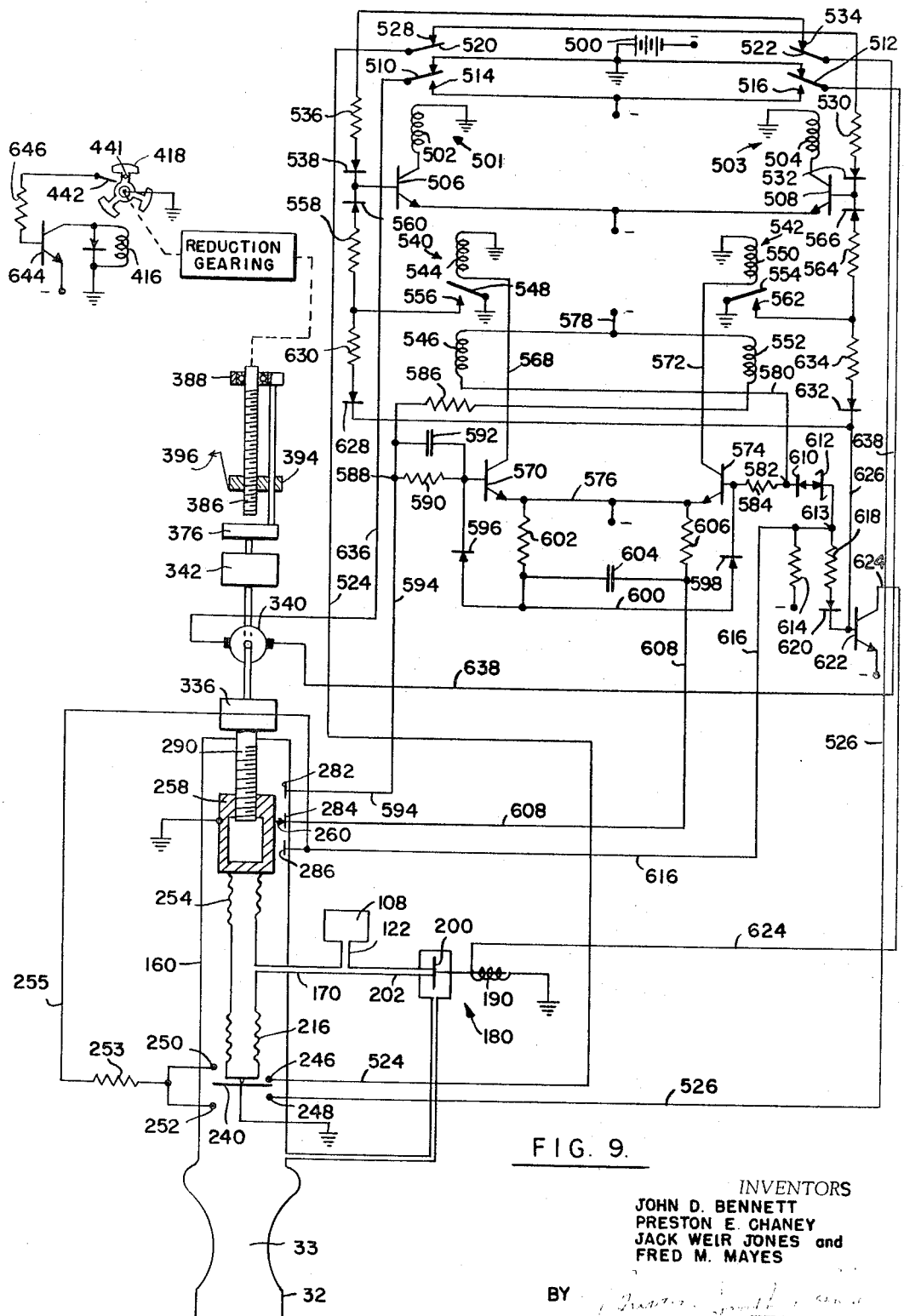
FIGURE 9 is a schematic diagram of the electronic circuitry for automatically controlling the operation of the instrument.

Reference may now be made to FIGURE 9 which shows schematically the electrical elements of the instrument and their connections together with a diagrammatic equivalent of the mechanical elements heretofore described. Referring first to the latter, chamber 33 within bag 32 is shown to be in communication with liner 160 which contains bellows 216 and 254 which are connected to the temperature compensating chamber 108 and to the solenoid operated valve 180 the latter of which provides a pressure equalizing connection between the bellows and chamber 33. The switch assembly containing the bar 240 is also indicated at the bottom of bellows 216. The top of the bellows 254 is shown connected to the nut portion 258 of member 256 which is engaged by threads 292 of screw 290 so as to be vertically moved by rotation of motor 340 through reduction gearing 336, contact 260 being carried by member 290. The gear unit 342 driving the carriage 376 and rods 382 which rotate the stylus assembly 394 are also diagrammed, together with the clock-driven screw 386 which advances the stylus nut 394. The clock is also indicated, its balance wheel being shown at 418, while the escapement and reduction gearing is indicated by the block marked "reduction gearing." Ground is provided by the casing of the instrument, to which the positive terminal of the battery 500 is connected. To avoid the complexity of showing negative leads, various terminals throughout the figure are indicated as negative, all of these being actually the same terminal, the negative terminal of the battery.

A pair of relays 501 and 503 have operating windings 502 and 504 one end of each of which is grounded. The ungrounded ends of these windings are connected to the collectors of the respective transistors 506 and 508, the emitters of which are returned to the negative supply terminal. Respective movable contacts 510 and 512 of these relays engage grounded fixed contacts when the relays are deenergized. When the respective relays are energized, the movable contacts engage fixed contacts 514 and 516 connected to the negative supply terminal. Relay 501 has another normally closed movable contact 520 connected through 524 to the contact 246. A similar normally closed movable contact 522 of relay 503 is connected through 526 to the contact 248. These are the closely spaced contacts engageable by the movable contact member 240 which is grounded. The fixed contact 528 normally engaged by the movable contact 520 is connected through resistor 530 and diode 532 to the base of transistor 508. In similar fashion the fixed contact 534 normally engaged by movable contact 522 is connected through resistor 536 and diode 538 to the base of transistor 506.

Another pair of relays 540 and 542 are provided. These are of a "memory" type. The movable contact 548 and 554 of which are releasably latched in both upper and lower positions by permanent magnets. However, the retention of the movable contact by these magnets is overcome to move the contacts by windings in each relay. In the case of the relay 540, the winding 544 will move the contact 548 to the upper position as illustrated, while a winding 546 will move it to its lower position to produce engagement with the fixed contact 556. A similar situation is involved in the relay 542. The winding 550 serving, when energized, to move the contact 554 upwardly, while the winding 552 serves to move it downwardly into engagement with fixed contact 562. The movable contacts 548 and 554 are grounded. Fixed contact 556 is connected through resistor 558 and diode 560 to the base of transistor 506. Contact 562 is similarly connected through resistor 564 and diode 566 to the base of transistor 508. The upper terminals of the windings 544 and 550 are grounded. The lower terminal of winding 544 is connected at 568 to the collector of transistor 570. Similarly the lower terminal of winding 550 is connected at 572 to the collector of transistor 574. The emitters of these transistors are connected at 576 to the negative supply terminal.

The upper terminals of windings 546 and 552 are connected at 578 to the negative supply terminal. The lower terminal of winding 546 is connected at 580 to a junction point 582 which is connected through resistor 584 to the base of transistor 574. The lower terminal of winding 552 is connected through resistor 586 to a junction point 588 which is connected through the parallel arrangement of resistor 590 and capacitor 592 to the base of transistor 570. The junction 588 is connected through line 594 to the upper contact 282 engageable by the grounded movable contact 260 carried by the screw 258.

Diodes 596 and 598 connect the bases of the respective transistors 570 and 574 to a connection 600 which is in turn connected through the resistor 602 to the negative supply terminal. Connection 600 is also connected through capacitor 604 and resistor 606 to the negative supply terminal. The junction between these last elements is connected at 608 to the center contact 284 engageable by contact 260.

Junction 582 is connected through diode 610 and Zener diode 612 to a junction 613 which is connected through resistor 614 to the negative supply terminal and also through line 616 to the lowermost contact 286 engageable by the movable contact 260.

A resistor 618 and diode 620 connect the junction 613 to the base of another transistor 622, the emitter of which is connected to the negative supply terminal while its collector is connected through 624 and the winding 190 of the solenoid valve to ground.

The fixed contact 556 of relay 540 is connected through diode 628 and resistor 630 to the connection 626 running to the base of transistor 622. The fixed contact 562 of relay 542 is similarly connected to the same base through diode 632 and resistor 634.

The movable contact 510 is connected through line 636 to the left-hand brush terminal of motor 340, while the movable contact 512 of relay 503 is connected through line 638 to the right-hand brush terminal of the same motor. This motor is of the permanent magnet field type, so that its rotation is reversed upon reversal of direction of current flow through its armature.

The clock operating winding 416 is energized from a transistor 644, this winding being connected between the collector of this transistor and ground. The base of the transistor is connected through resistor 646 to the contact 442 engageable by the grounded pin 441 on the balance wheel 418 of the clock.

The operation of the gauge may now be described with particular reference to FIGURE 9, the electrical elements under normal balanced condition being as shown. It may be noted that except for the pulses which operate the clock, there is normally no drain on the battery, the other electrical elements being normally deenergized.

Let it be first assumed that a sufficient pressure increase in the bore hole occurred to cause upward movement of contact 240 to engage contact 246, but insufficient to produce engagement with contact 250. It will also be initially assumed that the corrective movement of the nut 258 will be such as not to produce engagement between movable contact 260 and lower contact 286.

Engagement of 240 with 246 grounds the line 524 and, through normally closed contact 520 and 528, resistor 530 and diode 532, the base of transistor 508, which is thus rendered conductive to energize winding 504 of relay 503. Movable contact 512 then engages fixed contact 516 applying negative potential through line 638 to the right-hand brush terminal of motor 340. The left-hand brush terminal of this motor is grounded through line 636 and movable contact 510 of relay 501. The motor then runs in a direction to move nut 258 downwardly to compress the gas in the chamber provided by the bellows 216 and 254. When the pressure in this chamber equals that in the chamber 33, the contact of 240 with 246 is broken, rendering the transistor 508 nonconducting and deenergizing the winding 504 so that movable contact 512 is released with consequent arrest of movement of the motor 340. Through the reduction gearing arrangement the movement of the nut 258 is mechanically amplified to produce rotation of the marking stylus 396 as already described. The change of pressure is thus recorded.

While the energization of the relay 503 also breaks the contact between 522 and 534, no action results because the circuit is open at the contact 248.

If the bore hole pressure drops, the same type of operation occurs and this will be obvious from the symmetry of the circuit arrangement, contact being then made between contact 240 and 248 with energization of the transistor 506 and of relay 501. As will be obvious, the current flow through the motor is in the reverse direction, so that the member 256 is moved upwardly to effect lowering of pressure in the reference chamber. Arrest of this motion takes place when the contact 240 disengages the contact 248.

The foregoing describes the normal rebalancing operation which gives rise to a recording of small pressure changes in either direction.

Next considered will be the operation involved when a pressure increase is sufficient to cause the contact 240 to engage both 246 and 250. In a pressure change such as this, contact 246 will be first engaged to give rise to the operation which has already been described. However, when contact 250 is engaged there is a further operation as follows:

Line 616 is now connected to ground through resistor 253. Accordingly, terminal 613 goes positive providing a potential cutting off current through Zener diode 612. The base of transistor 622 being grounded, this transistor is rendered conductive energizing the winding 190 of the solenoid valve opening it to equalize the pressures in chamber 33 and within the bellows 216 and 254. Upon equalization of these pressures, contact 240 is restored to its open position, and the whole system is restored for normal pressure differential measurement.

As will be evident, engagement of contact 240 with contact 252 upon a large decrease of pressure in chamber 33 effects the same operations as those just described, with equalization of pressures. It will be noted that the pressure equalization just described relieves the action of the nut 258 of the pressure equalizing burden when pressure changes in either direction are large as just described. In effect, therefore, the operation of the system is made to be about a pressure equalization condition. High sensitivity against a large pressure background is thus secured for the measurement of small pressure changes.

Finally there must be considered the operation involved in maintaining the nut 258 (and movements of the upper end of bellows 254) within an operating range. The operating range, translated into positions of the nut, is between levels involving contacts of the movable contact 260 with the upper and lower contacts 282 and 286. Whenever the operation happens to result in the reaching of either of the limits, the nut (and the stylus) are restored to mid positions for continuation of the pressure differential measurement operations.

Assume that in its previous balancing movements the nut has moved so as to cause contact 260 to engage contact 286. In this case the junctions 613 and 582 are grounded through connection 616 rendering both transistors 574 and 622 conductive.

Conductivity of the latter transistor 622 provides energization of the solenoid valve winding 190, opening the valve to effect pressure equalization.

The grounding of the base of transistor 574 renders it conductive to energize winding 550. Contact 554 will already be in its upper position so that no mechanical operation of this relay will result.

The grounding of junction 613 has a further result in that, through connection 580 the winding 546 of relay 540 is energized, closing movable contact 548 against contact 556. Remembering that relay 540 is of a latching type, contact 548 will retain its circuit-closing position until positively moved therefrom.

Transistor 506 has its base now connected to ground through diode 560, resistor 558, and the engagement of contacts 548 and 556, and is accordingly rendered conductive to energize winding 502 of relay 501.

The resulting engagement between contacts 510 and 514 energizes the motor 340 as previously described, causing it to run in a direction to move the nut 258 upwardly. When the contact 260 disengages the contact 286 as a result of this movement, the motor nevertheless continues to run because relay 501 remains energized by reason of the latched-down condition of the contact 548 of relay 540. Furthermore, through resistor 630, diode 628 and connection 626 the transistor 622 remains conductive to maintain the solenoid valve winding 190 energized and the valve open.

The described conditions persist until the nut 258 reaches its mid position as determined by engagement of contact 284 by the movable contact 260.

Engagement of these contacts grounds line 608 connected through capacitor 604 to the connection 600, the connections also involving the resistors 602 and 606 and the connection of 576 to the negative supply terminal. The result is the application of positive pulses through diodes 596 and 598 to the bases of transistors 570 and 574, respectively. Both of these are rendered conductive so that the windings 544 and 550 of the respective relays 540 and 542 are energized. The energization of winding 544 raises the movable contact 548 breaking the connection of contact 556 to ground. This deenergizes the transistors 506 and 622 resulting in the deenergization of windings 502 and 190, causing the motor to stop and the solenoid valve to close.

The whole system is thus restored to its normal operating condition for pressure differential measurement, but now with the nut 258 in its mid position so as to be capable of an extended range of its movements.

As will be evident from the general symmetry of the system, corresponding operations will occur if the nut reaches its upper limit of travel with the contact 260 engaging contact 282. In this case the relays 542 and 503 will take over the operation of restoring the nut to its mid position by effecting operation of the motor in the reverse direction.

It may be noted that the restoration of the nut to mid position will produce corresponding movements of the marking stylus to its mid position. These movements, however, will be quite considerable and so pronounced as to be readily recognized on the chart. There is, therefore, no possibility that the resulting markings can be confused with the markings of significance representing the pressure changes which are to be measured.

Reference has previously been made to the fact that the pressure differences which are measured need not be those occurring in the liquid within a bore hole, but rather that the pressure difference exerted on the chamber 33 might be due to pressures exerted by a vapor of a vapor-type thermometer. If this is the case, variations in temperature may be measured. Such measurements are quite useful in the temperature logging of a bore hole, the apparatus being slowly traversed through the hole, encountered temperature changes being, generally, due to inflow of liquids into the hole, such liquids generally having temperatures differing from the temperature of the mud or other bore hole liquid.

It may be noted that when such temperature measurements are made it is still desirable to provide the temperature compensating chamber to eliminate the relatively uncertain deviations of pressure in the pneumatic part of the system which, in itself, will operate as if independent of temperature changes. The significant temperature changes then measured will be due substantially entirely to the vapor pressure changes in the vapor thermometer element.

It will be evident that various changes in details of construction and operation may be made without departing from the invention as defined in the following claims.

What is claimed is:

1. A pressure responsive measuring and recording instrument for use in a bore hole comprising a housing adapted to be lowered into said bore hole, means providing within said housing an expansible chamber having a pair if walls movable independently to control the volume of said chamber, one of said walls being exposed to bore hole pressure to vary the volume of said chamber, servo means having a normal zero position and operable to move the second of said walls to vary the volume of said chamber, means sensitive to movement of the first wall to control said servo means to move the second wall to a position to change the pressure within said chamber to substantial equality with the bore hole pressure, thereby to restore said first wall substantially to a predetermined position, means sensitive to a predetermined limit movement of said servo means from its normal zero position to subject the interior of said chamber to said bore hole pressure to provide for flow of fluid to equalize the pressure in the interior of the chamber with the bore hole pressure, means for simultaneously restoring said servo means fully to its zero position and means for then isolating the interior of said chamber from the bore hole pressure, and means operated by said servo means to record the position of said servo means and thereby provide a record of bore hole pressure changes.

2. An instrument according to claim 1 comprising means providing a second chamber enclosing said expansible chamber and having a flexible wall exposed to the bore hole pressure so that the interior of said second chamber has continuously a pressure substantially equal to the bore hole pressure, and in which fluid flow for equalization of the pressure within the first chamber with the bore hole pressure is effected by interchange of fluid between said chambers.

3. A pressure responsive measuring and recording instrument for use in a bore hole comprising a housing adapted to be lowered into said bore hole, means providing within said housing an expansible chamber having a pair of walls movable independently to control the volume of said chamber, one of said walls being exposed to bore hole pressure to vary the volume of said chamber, servo means having a normal zero position and operable to move the second of said walls to vary the volume of said chamber, means sensitive to movement of the first wall to control said servo means to move the second wall to a position to change the pressure within said chamber to substantial equality with the bore hole pressure, thereby to restore said first wall substantially to a predetermined position, means sensitive to a large bore hole pressure change to subject the interior of said chamber to said bore hole pressure to provide for flow of fluid to equalize the pressure in the interior of the chamber with the bore hole pressure, means to then isolate the interior of said chamber from the bore hole pressure, and means operated by said servo means to record the position of said servo means and thereby provide a record of bore hole pressure changes.

4. An instrument according to claim 3 comprising means providing a second chamber enclosing said expansible chamber and having a flexible wall exposed to the bore hole pressure so that the interior of said second chamber has continuously a pressure substantially equal to the bore hole pressure, and in which fluid flow for equalization of the pressure within the first chamber with the bore hole pressure is effected by interchange of fluid between said chambers.

References Cited by the Examiner

UNITED STATES PATENTS

| | | | |
|---|---|---|---|
| 2,139,105 | 12/1938 | Wells. | |
| 2,265,098 | 12/1941 | Bettis | 73—410 X |
| 2,397,876 | 4/1946 | Martin et al. | |
| 2,711,649 | 6/1955 | Baker. | |
| 2,713,266 | 7/1955 | Smith et al. | 73—398 X |
| 2,737,804 | 3/1956 | Herzog et al. | 73—38 |
| 2,906,120 | 9/1959 | Buck | 73—398 X |
| 2,980,835 | 4/1961 | Williams | 73—398 X |
| 3,065,633 | 11/1962 | Lubinski | 73—151 |
| 3,190,123 | 6/1965 | Schmitt | 73—398 |

RICHARD C. QUEISSER, *Primary Examiner.*

J. W. MYRACLE, *Assistant Examiner.*